United States Patent
Vtyurina et al.

(10) Patent No.: US 11,728,980 B2
(45) Date of Patent: Aug. 15, 2023

(54) SYSTEM FOR SECURE DATA TRANSMISSION IN DIGITAL DATA TRANSMISSION NETWORK USING SINGLE-PASS QUANTUM KEY DISTRIBUTION SYSTEM AND METHOD OF KEY NEGOTIATION DURING OPERATION OF THE SYSTEM

(71) Applicant: Joint stock company "InfoTeCS", Moscow (RU)

(72) Inventors: Anna Georgievna Vtyurina, Moscow (RU); Andrey Evgenievich Zhilyaev, Moscow (RU)

(73) Assignee: Joint stock company "Info TeCS"

(*) Notice: Subject to any disclaimer, the term of this patent is extended or adjusted under 35 U.S.C. 154(b) by 15 days.

(21) Appl. No.: 17/297,945

(22) PCT Filed: Jan. 16, 2020

(86) PCT No.: PCT/RU2020/000018
§ 371 (c)(1),
(2) Date: May 27, 2021

(87) PCT Pub. No.: WO2021/133204
PCT Pub. Date: Jul. 1, 2021

(65) Prior Publication Data
US 2022/0417013 A1    Dec. 29, 2022

(30) Foreign Application Priority Data
Dec. 27, 2019   (RU) .......................... RU2019144324

(51) Int. Cl.
*H04L 9/08* (2006.01)
*G06F 21/72* (2013.01)
*H04L 9/32* (2006.01)

(52) U.S. Cl.
CPC ............ *H04L 9/0838* (2013.01); *G06F 21/72* (2013.01); *H04L 9/0819* (2013.01);
(Continued)

(58) Field of Classification Search
CPC ................. H04L 9/0838; H04L 9/0819; H04L 9/0852; H04L 9/0869; H04L 9/32; G06F 21/72
(Continued)

(56) References Cited

U.S. PATENT DOCUMENTS

| 2005/0063547 A1 | 3/2005 | Berzanskis et al. |
| 2006/0062392 A1 | 3/2006 | Lee et al. |

(Continued)

FOREIGN PATENT DOCUMENTS

| RU | 2 295 199 C1 | 3/2007 |
| RU | 2 706 175 C1 | 11/2019 |

(Continued)

OTHER PUBLICATIONS

Balygin, K.A., Zaitsev, V.I., Klimov, A.N. et al. (2018), "A Quantum Random Number Generator Based on the 100-Mbit/s Poisson Photocount Statistics." J. Exp. Theor. Phys. 126. 728-740. ISSN 1063-7761. [English Language]. Original Russian Text © K.A. Balygin, V.I. Zaitsev, A.N. Klimov, S.P. Kulik, S.N. Molotkov, 2018, published in *Zhurnal Eksperimental'noi i Teoreticheskoi Fiziki, 2018*, vol. 153, No. 6, pp. 879-894.

(Continued)

*Primary Examiner* — Bryan F Wright
(74) *Attorney, Agent, or Firm* — Mintz, Levin, Cohn, Ferris, Glovsky and Popeo, P.C.

(57) ABSTRACT

The present invention relates to cryptographic protection of information by using keys derived from quantum keys from an associated quantum key distribution (QKD) system. The system includes a transmitting node and a receiving node of a single-pass QKD system, and two encryptors connected by (Continued)

a classical communication channel. The one encryptor is further connected to the transmitting node of the QKD system by a first local communication link, and the other encryptor is connected to the receiving node of the QKD system by a second local communication link. A method of implementing the system includes generating encryption keys and authentication keys based on quantum keys of a size not less than the one specified in operation of the system, exchanging service data in course of execution of the quantum protocol using the encryption keys and authentication keys, and providing identity of the encryption keys and the authentication keys.

2 Claims, 1 Drawing Sheet

(52) U.S. Cl.
CPC ........ *H04L 9/0852* (2013.01); *H04L 9/0869* (2013.01); *H04L 9/32* (2013.01)

(58) Field of Classification Search
USPC ........................................................ 713/155
See application file for complete search history.

(56) References Cited

U.S. PATENT DOCUMENTS

| | | | |
|---|---|---|---|
| 2008/0144833 A1* | 6/2008 | Matsumoto | H03M 13/1151 380/278 |
| 2018/0054304 A1 | 2/2018 | Tanizawa | |
| 2019/0238326 A1 | 8/2019 | Ji et al. | |
| 2021/0083865 A1* | 3/2021 | Obadia | H04L 9/0858 |

FOREIGN PATENT DOCUMENTS

| | | | |
|---|---|---|---|
| RU | 2 736 870 C1 | 11/2020 | |
| WO | WO-2010/030161 A2 | 3/2010 | |
| WO | WO-2012072983 A2 * | 6/2012 | ........... H04L 9/0838 |
| WO | WO-2021/133204 A1 | 7/2021 | |

OTHER PUBLICATIONS

Balygin, K.A., V.I. Zaitsev, A.N., Klimov, S.P. Kulik, S.N. Molotkov. (2018), published in Zhurnal Eksperimental'noi i Teoreticheskoi Fiziki, 2018, vol. 153, No. 6, pp. 879-894. Original Russian Text © [Russian Language].
Infotecs (Sep. 5, 2019). "Infotecs and ECI Telecom conducted compatibility of their products," Infotecs, 3 pages. Web. Retreived Aug. 26, 2021. https://infotecs.ru/about/press-centr/news/infoteks-i-eci-telecom-proveli-ispytaniya-na-sovmestimost-svoikh-produktov.html.
International Search Report issued in International Application No. PCT/RU2020/000018, (PCT/ISA/210), dated Oct. 8, 2020 (Oct. 8, 2020). 1 page. [English language].
International Search Report issued in International Application No. PCT/RU2020/000018, (PCT/ISA/210), dated Oct. 8, 2020 (Oct. 8, 2020). 2 pages. [Russian language].
Molotkov, S.N. (2012), "On Geometrically Uniform States in Quantum Cryptography." Jetp Lett. 95(6):332-337. ISSN 0021-3640. [English Language]. Original Russian Text © S.N. Molotkov, 2012, published in *Pis'ma v Zhurnal Eksperimental'noi i Teoreticheskoi Fiziki, 2012*, vol. 95, No. 6, pp. 361-366.
Molotkov, S.N. (2012), S.N. Molotkov, 2012, published in Pis'ma v Zhurnal Eksperimental'noi i Teoreticheskoi Fiziki, 2012, vol. 95, No. 6, pp. 361-366. Original Russian Text © [Russian Language].
Written Opinion issued in International Application No. PCT/RU2020/000018, (PCT/ISA/237), Box V, (dated Oct. 8, 2020 (Oct. 8, 2020). 6 pages. [English language translation].
Written Opinion issued in International Application No. PCT/RU2020/000018, dated Oct. 8, 2020 (Oct. 8, 2020). 10 pages. [Russian language].

* cited by examiner

SYSTEM FOR SECURE DATA TRANSMISSION IN DIGITAL DATA TRANSMISSION NETWORK USING SINGLE-PASS QUANTUM KEY DISTRIBUTION SYSTEM AND METHOD OF KEY NEGOTIATION DURING OPERATION OF THE SYSTEM

TECHNICAL FIELD

The present invention relates to cryptographic protection of information and data transmission, and more specifically, to systems for cryptographic protection of information which use keys derived from quantum keys from an associated quantum key distribution system, to enhance security of transmitted information.

BACKGROUND ART

Usage of quantum key distribution (QKD) systems has the potential to protect information transmitted in digital data transmission networks. Quantum cryptographic equipment for information security can be used to enable delivery, to subscribers, of a symmetric key for encryption and decryption of user data being transmitted, as well as prompt change of the key in accordance with security requirements.

Patent Application US2018/0054304 (having the priority of Aug. 19, 2016) discloses a method and device for transmitting information by using a QKD technology, wherein the communication device comprises a providing unit, a flow control unit, and a cryptography processing unit, and the method comprises transmitting and using keys in the device. The providing unit provides cryptographic keys generated using the quantum key distribution (QKD) technology. If a cryptographic key has not been provided at the time of reception of data by the communication device, the flow control unit performs one of the following three operations: destroying (deleting) the data, holding the data in a buffer, or attaching to the data a tag indicating that the cryptographic key has not been provided, and then outputting the data to the cryptography processing unit. Upon reception of the data from the flow control unit, the cryptography processing unit performs the cryptography processing (encrypting) of the data by using the cryptographic key.

This device is used to implement an information transmission system consisting of key generation devices for generating cryptographic keys using the QKD technology, and the communication devices described above.

Said device and method have the following drawbacks.

If a cryptographic key is missing for a long period of time, then secure data transmission is interrupted. In this case, the deletion of data can be unacceptable due to the nature of the data being transmitted, and the size of a buffer for data waiting for the key can be limited, i.e. execution of the first operation by the flow control unit may be prohibited, while execution of the second operation is unfeasible due to the fully loaded data buffer.

Keys transmitted to two communication devices in the system can generally be different due to unforeseen errors. However, neither identity verification of the loaded keys, nor control of usage of the same key for data encryption and decryption are performed, possibly making impossible to decrypt, in the one communication device, data encrypted with another key in the other communication device. Therefore, the device becomes unable to fulfill its intended function of transmitting information.

An authentication method and apparatus for performing said method for a quantum cryptography system are disclosed in Patent Application US2019/0238326 (the priority of Jan. 29, 2018); the method comprising: comparing sequences transmitted through a quantum communication channel at locations of matching bases.

This method has the following drawback: quantum cryptography devices are directly authenticated, rather than data being transmitted in the process of generating a quantum key, particularly, service messages for negotiating measurement bases, correcting error, and the step of enhancing secrecy. Thus, no integrity and authenticity of the service data is ensured, and an intruder can carry out a man-in-the-middle attack by incorporating into the quantum and classical channel of the QKD system and forcing a service traffic.

Furthermore, Patent Application US2005/0063547 (priority of May 3, 2004) discloses a method and apparatus for encryption by using quantum key distribution (QKD), the apparatus comprising:

first and second transmitting/receiving nodes respectively coupled to first and second encryption/decryption processors;

first and second QKD stations respectively connected to the first and second encryption/decryption processors and adapted to exchange quantum keys and provide them to the first and second encryption/decryption processors;

first and second classical key distribution nodes respectively connected to the first and second encryption/decryption processors and adapted to exchange classical keys and provide the classical keys to the first and second encryption/decryption processors.

The encryption/decryption processors are adapted to receive signals from one of the transmitting/receiving nodes, encrypt the signals by using a session key obtained in the encryption/decryption processor through adding, by XOR operation, the quantum and classical keys, and transmit the encrypted signal to the other transmitting/receiving station.

The apparatus implements a method of transmitting encrypted signals between first and second transmitting/receiving stations, the method comprising:

sending a first plaintext signal from the first transmitting/receiving station to a first encryption/decryption processor of a classical encryption system also comprising a second encryption/decryption processor;

exchanging quantum keys between first and second QKD stations in a QKD system, and providing the quantum keys to the first and second encryption/decryption processors, exchanging classical keys between first and second classical key exchange stations, and providing the classical keys to the first and second encryption/decryption processors, generating a session key through adding, by XOR operation, the provided classical and quantum keys, generating, in the first encryption/decryption processor, an encrypted signal from the first plaintext signal by using the session key generated in the first encryption/decryption processor, generating, in the second encryption/decryption processor, a decrypted signal from the encrypted signal received from the first encryption/decryption processor by using the session key generated in the second encryption/decryption processor; and, sending a second plaintext signal to the second transmitting/receiving station.

The aforementioned system and method are referred to as the closest prior art for the present invention.

However, said known technical solution has several disadvantages.

Control of identity of (quantum and classical) keys being used in the encryption/decryption processors is performed by open transmission of key identifiers over a communication link between the processors, which can cause forcing the use of different session keys for encryption and decryption of a signal in the processor.

The usage of an external source of classical keys in the closest prior art for frequent distribution of the keys requires to use asymmetric cryptography based techniques, thereby increasing risks of compromising the distributed keys.

Another disadvantage relates to presence of separate interaction channels for the QKD system and the classical key exchange system, thereby increasing costs for manufacturing and deploying the system.

SUMMARY OF THE INVENTION

The technical result refers to:

1) improved security of user data being transmitted;
2) enhanced robustness of the system, including the case of distortions (occasional or deliberate) introduced by a local communication link, the case of unforeseen or deliberate short-term failures of the QKD system which manifest in temporarily interrupted generation of quantum keys, the case of a low rate of generation of quantum keys and/or generation of short-length quantum keys, and the case of forcing false key identifiers;
3) reduced costs of manufacturing, deploying, and operating the system by reducing the number of classic communication links;
4) improved strength of quantum keys generated by the QKD system, through authenticating service data of the QKD system with authentication keys generated from the quantum keys and authenticating the QKD system service data as a whole, before splitting into blocks used for transmission over a digital communication line and subsequent encryption of the QKD system service data.

To this end, a system is provided for secure data transmission in a digital data transmission network by using a single-pass quantum key distribution system, the system comprising:

a transmitting node of a quantum key distribution (QKD) system, the transmitting node including:
  a transmitting quantum key generation module,
  a key negotiation module of the transmitting node;
a receiving node of the QKD system, the receiving node including:
  a receiving quantum key generation module,
  a key negotiation module of the receiving node;
a 1st encryptor connected with the key negotiation module of the transmitting node;
a 2nd encryptor connected with the key negotiation module of the receiving node;
wherein
the transmitting quantum key generation module is connected to the receiving quantum key generation module by a quantum communication link implemented as a fiber optic line;
the 1st encryptor is connected to the 2nd encryptor by a transport link implemented as a digital data transmission network;
the 1st encryptor is connected to the key negotiation module of the transmitting node by a 1st local communication link (1st LCL);
the 2nd encryptor is connected to the key negotiation module of the receiving node by a 2nd local communication link (2nd LCL);
the 1st encryptor is connected to an external digital data transmission network;
the 2nd encryptor is connected to the external digital data transmission network;
wherein
the transmitting quantum key generation module is configured to:
  generate random numbers,
  prepare quantum information states,
  send the quantum information states over the quantum communication link to the receiving quantum key generation module,
  generate quantum keys cooperatively with the receiving quantum key generation module by processing information derived from the quantum information states;
the key negotiation module of the transmitting node is configured to:
  generate authentication keys and encryption keys based on the quantum keys,
  negotiate the authentication keys and the encryption keys with authentication keys and encryption keys generated by the receiving node key negotiation module,
  receive data from the 1st encryptor over the 1st LCL,
  transmit data to the 1st encryptor over the 1st LCL,
the receiving quantum key generation module is configured to:
generate random numbers,
receive the quantum information states over the quantum communication link from the transmitting quantum key generation module,
process the quantum information states,
generate the quantum keys cooperatively with the transmitting quantum key generation module by processing the information derived from the quantum information states;
the key negotiation module of the receiving node is configured to:
  generate authentication keys and encryption keys based on the quantum keys,
  negotiate the authentication keys and the encryption keys with the authentication keys and encryption keys generated by the key negotiation module of the transmitting node,
  receive data from the 2nd encryptor over the 2nd LCL,
  transmit data to the 2nd encryptor over the 2nd LCL;
the 1st encryptor is configured to:
  receive the encryption keys and service data from the key negotiation module of the transmitting node over the 1st LCL,
  transmit service data to the key negotiation module of the transmitting node over the 1st LCL, receive data from an external digital data transmission network,
  encrypt the data received thereby over the external digital data transmission network or over the 1st LCL, by using the encryption keys,
  transmit the data encrypted using the encryption keys over a transport link,
  decrypt data received from the transport link by using the encryption keys,
  transmit data to the external digital data transmission network;

the 2nd encryptor is configured to:
  receive the encryption keys and service data from the key negotiation module of the receiving node over the 2nd LCL,
  transmit service data to the key negotiation module of the receiving node over the 2nd LCL,
  receive data from the external digital data transmission network,
  encrypt the data received over the external digital data transmission network or over the 2nd LCL, by using the encryption keys,
  transmit the data encrypted using the encryption keys over the transport link,
  decrypt data received from the transport link by using the encryption keys,
  transmit data to the external digital data network.

A method is also provided for negotiating keys in operation of the system, the method comprising:
  selecting a quantum protocol;
  selecting a size of a block equal to b, where b is a multiple of a power of integer 2;
  selecting a size of an encryption key equal to n blocks;
  selecting a size of an authentication key equal to m blocks;
  selecting a minimum amount of an accumulated quantum key equal to Key=m+n blocks;
  setting a value of a counter of authentication keys in the key negotiation module of the transmitting node to M1=1;
  setting a value of a counter of authentication keys in the key negotiation module of the receiving node to M2=2;
  setting a value of a counter of encryption keys in the key negotiation module of the transmitting node to N1=1;
  setting a value of a counter of encryption keys in the key negotiation module of the receiving node to N2=2;
  generating a current authentication key having a size of m blocks by performing the following steps:
  adding, to the authentication key, an identifier in the form of a data block, the identifier comprising the counter value M1 and a feature value of the authentication key;
  incrementing the counter value M1 by 1;
  generating a current encryption key having a size of n blocks by performing the following steps:
  adding, to the encryption key, an identifier in the form of a data block, the identifier comprising the counter value N1 and a feature value of the encryption key;
  incrementing the counter value N1 by 1;
  loading the current authentication key into the key negotiation modules of the receiving and transmitting nodes;
  loading the current encryption key into the 1st and 2nd encryptors;
  (A) accumulating quantum keys in the key negotiation modules of the transmitting and receiving nodes of the QKD system by performing the following steps:
  (B) generating a quantum key in the transmitting and receiving quantum key generation modules in accordance with the selected quantum protocol, wherein, when executing the quantum protocol in part of transmitting service data from the transmitting quantum key generation module to the receiving quantum key generation module, the following steps are performed:
  generating a service message from the service data in the transmitting quantum key generation module;
  transmitting the service data from the transmitting quantum key generation module to the key negotiation module of the transmitting node;
  performing authentication of the service message by using the current authentication key in the key negotiation module of the transmitting node;
  transmitting the authenticated service message over the 1st LCL to the 1st encryptor;
  encrypting the authenticated service message by using the current encryption key in the 1st encryptor;
  transmitting the encrypted authenticated service message to the 2nd encryptor over the transport link;
  decrypting the encrypted authenticated service message in the 2nd encryptor by using the current encryption key;
  transmitting the authenticated service message from the 2nd encryptor to the key negotiation module of the receiving node over the 2nd LCL;
  verifying authenticity of the received service message by using the current authentication key in the key negotiation module of the receiving node, and, if the verification of authenticity is successful, then
  transmitting the service message from the key negotiation module of the receiving node to the receiving quantum key generation module;
  otherwise,
  signaling failed authentication;
  going to step B;
  when executing the quantum protocol in part of transmitting service data from the receiving quantum key generation module to the transmitting quantum key generation module, the following steps are performed:
  generating a service message from the service data in the receiving quantum key generation module;
  transmitting the service data from the receiving quantum key generation module to the key negotiation module of the receiving node;
  performing authentication of the service message using the current authentication key in the key negotiation module of the receiving node;
  transmitting the authenticated service message over the 2nd LCL to the 2nd encryptor;
  encrypting the authenticated service message by using the current encryption key in the 2nd encryptor;
  transmitting the encrypted authenticated service message to the 1st encryptor over the transport link;
  decrypting the encrypted authenticated service message in the 1st encryptor by using the current encryption key;
  transmitting the authenticated service message from the 1st encryptor to the key negotiation module of the transmitting node over the 1st LCL;
  verifying authenticity of the received service message by using the current authentication key in the key negotiation module of the transmitting node, and if the verification of authenticity is successful, then
  transmitting the service message from the key negotiation module of the transmitting node to the transmitting quantum key generation module;
  otherwise,
  signaling failed authentication;
  going to step B;
  after generating the quantum key in the receiving and transmitting quantum key generation modules, transmitting the derived quantum key from the receiving quantum key generation module to the key negotiation module of the receiving node and from the transmitting quantum key generation module to the key negotiation module of the transmitting node;
  storing the received quantum key in the key negotiation modules of the receiving and transmitting nodes;

checking a total size of stored quantum keys in the quantum key negotiation modules of the receiving and transmitting nodes, and, if the total size of the stored quantum keys is less than Key blocks, going to step B;

generating a new authentication key and a new encryption key from Key blocks of the stored quantum key in the quantum key negotiation modules of the receiving and transmitting nodes, by performing the following steps:

generating the new authentication key in the quantum key negotiation module of the transmitting node by concatenating the first m blocks of the accumulated quantum key;

adding, to the authentication key, an identifier in the form of a data block, the identifier comprising the authentication key counter value M1 and the authentication key feature value;

incrementing the authentication key counter value M1 by 1;

generating the new encryption key in the quantum key negotiation module of the transmitting node by concatenating next n blocks of the accumulated quantum key;

adding, to the encryption key, an identifier in the form of a data block, the identifier comprising the encryption key counter value N1 and the encryption key feature value;

incrementing the encryption key counter value N1 by 1;

generating the new authentication key in the quantum key negotiation module of the receiving node by concatenating the first m blocks of the accumulated quantum key;

adding, to the authentication key, an identifier in the form of a data block, the identifier comprising the authentication key counter value M2 and the authentication key feature value;

incrementing the authentication key counter value M2 by 1;

generating the new encryption key in the quantum key negotiation module of the receiving node by concatenating next n blocks of the accumulated quantum key;

adding, to the encryption key, an identifier in the form of a data block, the identifier comprising the encryption key counter value N2 and the encryption key feature value;

incrementing the encryption key counter value N2 by 1;

comparing the identifiers of the obtained new authentication key and the obtained new encryption key from the key negotiation module of the receiving node with the identifiers of the new authentication key and the new encryption key in the key negotiation module of the transmitting node, and if the authentication key identifiers match, then transmitting a message on successful verification of the authentication key identifiers from the key negotiation module of the transmitting node to the key negotiation module of the receiving node as an encrypted authenticated service message encrypted with the current encryption key and authenticated with the current authentication key;

receiving, in the key negotiation module of the transmitting node, the service message on successful verification of the authentication key identifiers;

replacing the current authentication key with the new authentication key in the key negotiation modules of the receiving and transmitting nodes;

otherwise, going to step A;

if the encryption key identifiers match, then transmitting a message on successful verification of the encryption key identifiers from the key negotiation module of the transmitting node to the key negotiation module of the receiving node as an encrypted authenticated service message encrypted with the current encryption key and authenticated with the current authentication key, receiving, in the key negotiation module of the transmitting node, the service message on successful verification of the encryption key identifiers, otherwise, going to step A;

transmitting the generated new encryption keys from the key negotiation module of the transmitting node to the 1st encryptor over the 1st LCL and from the key negotiation module of the receiving node to the 2nd encryptor over the 2nd LCL;

comparing the identifier of the received new encryption key in the 2nd encryptor with the identifiers of the new encryption key by performing the following steps:

transmitting the identifier of the new encryption key from the 1st encryptor to the 2nd encryptor as an encrypted service message encrypted with the current encryption key;

receiving, in the 2nd encryptor, the service message with the identifier of the new encryption key;

comparing, in the 2nd encryptor, the identifiers of the new encryption keys;

if the encryption key identifiers do not match, then signaling failed reception of the encryption keys by the encryptors;

going to step A;

otherwise, storing the received encryption keys in the encryptors for further use.

The intended purpose of the system is to provide an encrypted communication channel between two nodes of a trusted communication network (for example, in local area networks of government agencies and departments, corporations).

The system receives data which is to be securely delivered to its destination (e.g. user data) to the 1st encryptor. The data received at the 1st encryptor is encrypted by using current keys generated by using negotiated keys obtained using quantum keys from the QKD system. Strength of the current encryption keys is resulting from strength of the quantum keys from which the current encryption keys are generated, thereby causing enhancement of security of the user data transmitted with protection by such keys.

Then, the 1st encryptor transmits the encrypted data over the transport link to the 2nd encryptor which decrypts information by using the current encryption keys generated using the negotiated keys that are obtained using the quantum keys from the QKD system, and transmits it to the destination.

To ensure secure transmission of information, the encryptors require identical encryption keys. The use of the present key negotiation method ensures usage of identical keys for both data encryption and data decryption, thereby achieving security of transmitted user data, as compared to the chosen closest prior art wherein usage of different session keys for encryption and decryption can be forced.

In the present method, quantum keys are used not only to generate encryption keys, but also to generate authentication keys. Identity of the encryption keys and identity of the authentication keys in the paired encryptors on different sides of the transport link is necessary for correct execution of respective operations, particularly, encryption and decryption, as well as for data authentication and data authenticity verification.

The quantum keys used to generate the encryption keys and the authentication keys are identical in two components (transmitting and receiving nodes) of the QKD system due to specificity of functioning of the quantum protocol. As new keys are further generated from the quantum keys, it is necessary to confirm that identical encryption keys (or authentication keys) will be applied in the two encryptors connected by the transport link (or the two key negotiation modules of the QKD system).

To this end, the present method employs negotiating keys by their identifiers through comparing the key identifiers. If the identifiers do not match, then their associated keys are discarded (deleted) so that performance of the system is not disrupted due to the mismatch between the keys that are to be identical. Additional comparison of the encryption key identifiers in the encryptors (in addition to the comparison thereof in the key negotiation modules before transmitting the encryption keys to the encryptors) enables to achieve improved robustness of the system in the case of distortions (occasional or deliberate) introduced by the local communication link connecting the QKD system node with the encryptor.

Usage of part of a quantum key to authenticate the QKD system service data, including data of the quantum protocol for post-processing sequences, which is transmitted in the quantum channel, increases strength of the generated quantum keys. Strength of the quantum keys is known to be dependent on robustness of a method of transmitting quantum states over the quantum channel, a method of encoding and detecting the quantum states, or algorithms for post-processing sequences derived from the quantum states, and on a method of protecting data exchanged between components of the QKD system at post-processing the sequences received from the quantum channel. The chosen quantum protocol defines robustness of the method for encoding and detecting the quantum states, and the sequence post-processing algorithm, but does not define a method for protecting service data during the post-processing of sequences. If the service data is not protected, man-in-the-middle attacks on QKD systems are possible. The service data is protected by authenticating and/or encrypting thereof.

Authentication of transmitted data can be provided either by using preliminarily distributed symmetric keys (pre-distributed keys) or by using quantum keys. At the initial time moment of operating the system, no quantum keys for authentication are available yet, since the quantum key generation as such requires an authenticated channel between the receiving and transmitting nodes of the QKD system. Therefore, primary authentication of all communicating parties in the system is based on the pre-distributed keys. To provide authentication, the quantum keys are subsequently used according to the present method.

In the present key negotiation method, each transmitted message is authenticated as a whole, thereby ensuring its integrity on the receiving side. Generally, in authentication of messages transmitted over classical communication links, the message is split into parts (e.g. frames for an Ethernet communication link or IP packets for a LAN/WAN communication link) before transmission, along with adding a message authentication code to each part. This method ensures integrity of each part separately, but does not ensure integrity of the complete message assembled from separate parts, since, for example, the order of message parts may be disarranged. In the present method, authentication of each message as a whole ensures its integrity, thereby improving strength of the quantum keys.

At high encryption rates, it is often necessary to replace a current encryption key with a new one, because admissible load on the encryption key is spent. For these purposes, the single-pass QKD system of the system is used. With said QKD system, quantum keys are generated and then accumulated in the key negotiation modules of the QKD system.

The accumulation of the quantum keys up to a required amount, long with subsequent generation of encryption keys for transmission to the encryptors, allows to use the system even at a low rate of generation of quantum keys and/or generation of quantum keys of a length less than the one required by the encryptor. Placing the encryption keys transmitted to the encryptor into a key store instead of being used immediately allows to fully utilize the admissible load on the current encryption key and perform the scheduled change of the current encryption key.

Upon accumulation of a sufficient number of quantum keys, encryption keys and authentication keys are generated therefrom, the encryption keys being for the encryptors and the authentication keys being for authenticating the QKD system service data transmitted between the receiving and transmitting nodes of the QKD system during execution of the quantum protocol. The sufficient number of the accumulated quantum keys refers to the number of quantum keys the total length of which is not less than the total length of at least one encryption key and one authentication key. Required lengths of encryption and authentication keys are determined by the encryption method and authentication method used.

Owing to the accumulation of quantum keys before subsequent generation of encryption keys and authentication keys, robustness of the system is improved in the case of unforeseen short-term failures of the one-pass QKD system which manifest in temporary interruption of the quantum key generation, or caused, for example, by intruder attacks on the quantum communication channel. In this case, the already generated quantum keys are saved, and, after restoration of operability of the QKD system, the system resumes accumulating quantum keys in addition to the previously accumulated quantum keys. Operability of the system is also maintained if the QKD system generates quantum keys with a length insufficient to generate new encryption keys and authentication keys. In this case, the quantum keys are accumulated to generate the required encryption keys and authentication keys, but from the plurality of accumulated quantum keys.

Encryption of both service data and identifiers used in negotiation and entry of keys into operation strengthens user data security and enhances robustness of the system against forcing false key identifiers. This ensures accomplishment by the device of its main function of secure transmission of user data with subsequent ensured decryption.

Furthermore, the system provided hereby has the advantage in data security over the closest prior art, since it does not use additional distribution of classical keys (except for primary pre-distributed keys for initializing the system which are necessary for any typical QKD system), thereby obtaining encryption keys to be used in encryptors which are resistant to attacks by a quantum computer. The classic key exchange system used in the closest prior art requires constructing a native communication link different from the communication link between the encryption/decryption processors in the prior art.

The present system uses only one classical communication link (transport link) connecting both the two encryptors and the two nodes of the QKD system.

The channel for transmitting service messages of the QKD system consists of the following information transmission channels:
- a channel, authenticated using quantum keys, for transmitting service information and quantum keys from the receiving node of the QKD system to the associated encryptor and backwards;
- a channel, authenticated using quantum keys, for transmitting user data between the encryptors;
- a channel, authenticated using quantum keys, for transmitting service information and quantum keys from the transmitting node of the QKD system to the associated encryptor and backwards.

Therefore, as compared to the closest prior art, the present invention does not require a separate channel for exchanging service data of the QKD system nodes when generating quantum keys; instead, a single channel is used to transmit service messages of the QKD system and transmit encrypted user data, thereby enabling to reduce the cost of manufacturing, deploying, and operating the system.

The transport link can be vulnerable to attacks by a possible intruder. When using the present apparatus and method, critical information containing information about data in the transport link, including service data of the QKD system classical channel about a quantum key, is transmitted in the form encrypted with the current encryption key. The invention enhances security of the transmitted user data and robustness of the system.

Figure 1:
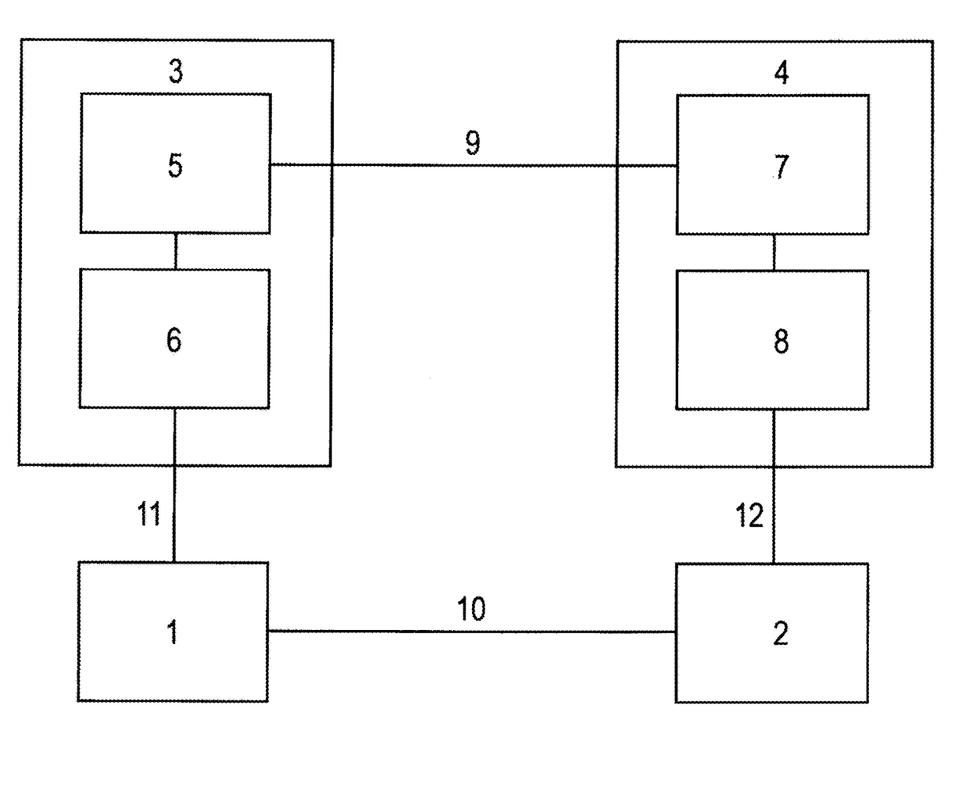
The FIGURE shows a schematic diagram of the system for secure data transmission using the QKD system.

Reference numerals in the drawing stand for:
1—the 1st encryptor,
2—the 2nd encryptor,
3—the transmitting node of the QKD system,
4—the receiving node of the QKD system,
5—the quantum key generation module of the transmitting node of the QKD system,
6—the key negotiation module of the transmitting node of the QKD system,
7—the quantum key generation module of the receiving node of the QKD system,
8—the key negotiation module of the receiving node of the QKD system,
9—the quantum communication link,
10—the transport link,
11—the 1st local communication link,
12—the 2nd local communication link.

IMPLEMENTATION OF THE INVENTION

The system and method provided hereby can be implemented, for example, using a conventional single-pass QKD system (see patent RU2706175) and two commercial encryptors, for example, hardware and software facilities ViPNet L2 10G (see the article at website infotecs.ru).

The key negotiation modules 6, 8 (in the FIGURE) should be preferably embodied as software modules within the transmitting node 3 and the receiving node 4 of the single-pass QKD system. The capability to receive encryption keys and service data over the local communication links 11, 12 is implemented in the encryptors 1, 2 also in software. Respective programs and modules can be developed by an expert in programming (programmer) based on the knowledge of functions to be performed.

A single-mode SMF-28 optical fiber of admissible length is selected as the quantum communication link 9. Two Ethernet patch-cords are chosen as the two local communication links 11, 12, the 1st encryptor 1 being connected to the key negotiation module of the transmitting node 6 of the QKD system and the 2nd encryptor 2 being connected to the key negotiation module of the receiving node 8 of the QKD system by said patch-cords, respectively. A standard telecommunications fiber or Ethernet line can be chosen as the transport link 10.

The method comprises the following steps.

A quantum protocol is chosen, for example, a protocol based on geometrically homogeneous coherent states (Molotkov S. N. On geometrically homogeneous coherent quantum states in quantum cryptography, Letters to ZhETF, vol. 95, issue 6, pp. 361-366, 2012).

The block size is chosen equal to 8 bits.

The encryption key size is 32 blocks, i.e. 256 bits, which corresponds e.g. to the encryption key size of the GOST 34.12-2018 "Kuznyechik" block cipher.

The authentication key size is chosen equal to 32 blocks.

The minimum amount of the accumulated quantum key is chosen equal to Key=32+32=64 blocks.

Program values of the counters of authentication keys and encryption keys are set to $M1=1$, $M2=2$, $N1=1$, $N2=2$, respectively.

The current authentication key with a length of 32 blocks is generated by e.g. using a quantum random number generator (Balygin K. A. et al. Quantum random number generator based on Poisson photocount statistics, with speed of about 100 Mbit/s, ZhETF, vol. 153, No. 6, pp. 879-894, 2018). The authentication key identifier is set to ID=(1,auth).

The current encryption key with a length of 32 blocks is generated by e.g. using a random number generator. The encryption key identifier is set to ID=(1,cipher).

The value of the counters M1 and N1 is incremented by 1. The new values of the counters are $M1=2$ and $N1=2$, respectively.

The generated authentication key is loaded into the key negotiation modules of the receiving and transmitting nodes of the QKD system, and the encryption key is loaded into the encryptors.

Accumulation of quantum keys in the negotiation modules is started. To this end, execution of the selected quantum protocol is started to derive a quantum key. Service data generated by the quantum key generation modules 5, 7 of the QKD system during the execution of the quantum protocol are authenticated using the current authentication key, for example, by calculating a message authentication code from the authenticated data according to GOST R 34.13-2015 and concatenating it to the service data, in the key negotiation module of the QKD system node.

The authenticated service data is then transmitted over the local link to the associated encryptor. In the encryptor, the data is encrypted using the current encryption key by the encryption algorithm implemented by the selected encryptor. The encrypted data is transmitted over the transport link to the 2nd encryptor. In the 2nd encryptor, the received data is decrypted and transmitted over the local communication link to the associated key negotiation module of the second node of the QKD system. The key negotiation module verifies authenticity of the received service data e.g. by calculating a message authentication code according to GOST R34.13-2015 from the service data using the current authentication key and comparing the calculated message authentication code with the one received over the service communication link. If the message authentication codes match, the service data is identified as authentic; otherwise, a signal is output regarding failed authentication of the service data, and the quantum key generation is terminated.

The authentication failed signal can be generated in any convenient form, for example, as a sound signal, a text message, etc., and sent to the administrator or a duty specialist from maintenance personnel of the system. Further actions upon receiving the signal should be defined by the adopted regulations for responding to emergency or abnormal situations during operation of the system.

After the execution of the quantum protocol has been completed, the generated quantum keys of a certain length are transmitted to the key negotiation modules. Due to features of quantum protocols, the length of the received quantum key is not fixed. For this reason, after receiving each quantum key, the key negotiation module checks whether the total length of the accumulated quantum keys, including the length of the newly received key, is sufficient. Assume that the length of the first received quantum key is 120 bits. The chosen minimum length of the accumulated quantum keys is 64 blocks, which is 512 bits. Therefore, the received quantum key is insufficient, and it is stored in memory of the key negotiation modules for further accumulation. Generation of the next quantum key is started.

Assume that the second quantum key is obtained having the length of 270 bits. The total length of the accumulated quantum keys is checked. In this case, the total length of the accumulated quantum keys, including the received one, is 120+270=390 bits, which is again less than the chosen minimum length. The second received quantum key is also stored in the memory of the key negotiation modules, and generation of the third quantum key is started.

Let the received third quantum key is obtained having the length of 150 bits. The total length of the accumulated quantum keys after receiving the third quantum key is 120+270+150=540 bits, which is greater than the chosen threshold of 512 bits. Therefore, the third quantum key is stored in the memory of the key negotiation modules, and the process goes to the next step of the method.

A new encryption key and a new authentication key are generated from the stored quantum keys simultaneously in both key negotiation modules of the QKD system nodes. To this end, the three quantum keys are concatenated into one bit string. The new authentication key is formed from the first 32 bit blocks from the obtained string. The authentication key is added with its identifier derived from the counter value and the key usage feature, that is, ID=(2,auth). The authentication key counters are incremented by 1, that is, M1=3, M2=3. The new encryption key is generated from the next 32 bits, and the identifier ID=(2,cipher) is similarly added to it, and the values of the encryption key counters are incremented: N1=3, N2=3.

After the new encryption keys and authentication keys have been generated, it is verified that the obtained keys are negotiated. To this end, their identifiers are compared. In particular, the identifiers of the encryption key and of the authentication key are transmitted as service data from the key negotiation module of the receiving node of the QKD system to the transmitting node of the QKD system, where the identifiers are compared. In doing this, in the process of transmitting the identifiers over the transport link between the encryptors, the identifiers are authenticated using the current authentication key and encrypted using the current encryption key, thereby protecting against forcing false identifiers by an intruder.

If the identifiers match, the new authentication key is assigned as the current key by which subsequent authentication of the service data will be performed. The new encryption keys, together with their identifiers, are transmitted over the service link to appropriate encryptors.

After arrival of the new encryption keys in the encryptors, it is verified in a similar way whether those keys are negotiated, by means of comparing the identifiers. If the identifiers of the new encryption keys match, then the keys are stored together with their identifiers in encryption key stores for further use.

After that, new generation of quantum keys is started.

The keys can be used to protect user data, while users can connect to any encryptor.

The invention claimed is:

1. A system for secure data transmission in a digital data transmission network by using a single-pass quantum key distribution system, the system comprising:
   a transmitting node of a quantum key distribution (QKD) system, the transmitting node including:
   a transmitting quantum key generation module,
   a key negotiation module of the transmitting node;
   a receiving node of the QKD system, the receiving node including:
   a receiving quantum key generation module,
   a key negotiation module of the receiving node;
   a first encryptor connected with the key negotiation module of the transmitting node;
   a second encryptor connected with the key negotiation module of the receiving node;
   wherein the transmitting quantum key generation module is connected to the receiving quantum key generation module by a quantum communication link implemented as a fiber optic line;
   wherein the first encryptor is connected to the second encryptor by a transport link implemented as a digital data transmission network;
   wherein the first encryptor is connected to the key negotiation module of the transmitting node by a first local communication link (first LCL);
   wherein the second encryptor is connected to the key negotiation module of the receiving node by a second local communication link (second LCL);
   wherein the first encryptor is connected to an external digital data transmission network;
   wherein the second encryptor is connected to the external digital data transmission network;
   wherein the transmitting quantum key generation module is configured to:
   generate random numbers,
   prepare quantum information states,
   send the quantum information states over the quantum communication link to the receiving quantum key generation module, and
   generate quantum keys cooperatively with the receiving quantum key generation module by processing information derived from the quantum information states;
   wherein the key negotiation module of the transmitting node is configured to:
   generate authentication keys and encryption keys based on the quantum keys, negotiate the authentication keys and the encryption keys with authentication keys and encryption keys generated by the key negotiation module of the receiving node, receive data from the first encryptor over the first LCL, and transmit data to the first encryptor over the first LCL;

wherein the receiving quantum key generation module is configured to:

generate random numbers, receive the quantum information states over the quantum communication link from the transmitting quantum key generation module, process the quantum information states, and generate the quantum keys cooperatively with the transmitting quantum key generation module by processing the information derived from the quantum information states;

wherein the key negotiation module of the receiving node is configured to:

generate the authentication keys and the encryption keys based on the quantum keys, negotiate the authentication keys and the encryption keys with the authentication keys and the encryption keys generated by the key negotiation module of the transmitting node, receive data from the second encryptor over the second LCL, and transmit data to the second encryptor over the second LCL;

wherein the first encryptor is configured to:

receive the encryption keys and service data from the key negotiation module of the transmitting node over the first LCL, transmit service data to the key negotiation module of the transmitting node over the first LCL, receive data from the external digital data transmission network, encrypt the data received over the external digital data transmission network or over the first LCL by using the encryption keys, transmit the data encrypted using the encryption keys over a transport link, decrypt data received from the transport link by using the encryption keys, and transmit data to the external digital data transmission network; and wherein the second encryptor is configured to:

receive the encryption keys and service data from the key negotiation module of the receiving node over the second LCL, transmit service data to the key negotiation module of the receiving node over the second LCL, receive data from the external digital data transmission network, encrypt the data received over the external digital data transmission network or over the second LCL by using the encryption keys, transmit the data encrypted using the encryption keys over the transport link, decrypt data received from the transport link by using the encryption keys, and transmit data to the external digital data transmission network.

2. A method of negotiating keys in operation of a system, the method comprising:

selecting a quantum protocol;

selecting a size of a block equal to b, where b is a multiple of a power of integer 2;

selecting a size of encryption keys equal to n blocks;

selecting a size of authentication keys equal to m blocks;

selecting a minimum amount of an accumulated quantum key equal to Key=m+n blocks;

setting an authentication key counter value in a key negotiation module of a transmitting node to M1=1;

setting an authentication key counter value in a key negotiation module of a receiving node to M2=2;

setting an encryption key counter value in the key negotiation module of the transmitting node to N1=1;

setting an encryption key counter value in the key negotiation module of the receiving node to N2=2;

generating a current authentication key having a size of m blocks;

adding, to the current authentication key, an identifier in the form of a data block, the identifier comprising the authentication key counter value M1 and an authentication key feature value;

incrementing the authentication key counter value M1 by 1;

generating a current encryption key having a size of n blocks;

adding, to the current encryption key, an identifier in the form of a data block, the identifier comprising the encryption key counter value N1 and an encryption key feature value;

incrementing the encryption key counter value N1 by 1;

loading the current authentication key into key negotiation modules of the receiving and transmitting nodes;

loading the current encryption key into first and second encryptors;

(A) accumulating quantum keys in the key negotiation modules of the transmitting and receiving nodes of a QKD system by performing the following steps:

(B) generating a quantum key in transmitting and receiving quantum key generation modules in accordance with the selected quantum protocol, wherein, when executing the quantum protocol in part of transmitting service data from the transmitting quantum key generation module to the receiving quantum key generation module, the following steps are performed:

generating a service message from the service data in the transmitting quantum key generation module;

transmitting the service data from the transmitting quantum key generation module to the key negotiation module of the transmitting node;

performing authentication of the service message by using the current authentication key in the key negotiation module of the transmitting node;

transmitting the authenticated service message over a first LCL to the first encryptor;

encrypting the authenticated service message by using the current encryption key in the first encryptor;

transmitting the encrypted authenticated service message to the second encryptor over a transport link;

decrypting the encrypted authenticated service message in the second encryptor by using the current encryption key;

transmitting the authenticated service message from the second encryptor to the key negotiation module of the receiving node over a second LCL; and verifying authenticity of the received service message by using the current authentication key in the key negotiation module of the receiving node, wherein, if the verification of authenticity is successful, then transmitting the service message from the key negotiation module of the receiving node to the receiving quantum key generation module; or else, signaling failed authentication; and proceeding to step B;

when executing the quantum protocol in part of transmitting service data from the receiving quantum key generation module to the transmitting quantum key generation module, the following steps are performed:

generating a service message from the service data in the receiving quantum key generation module;

transmitting the service data from the receiving quantum key generation module to the key negotiation module of the receiving node;

performing authentication of the service message by using the current authentication key in the key negotiation module of the receiving node;

transmitting the authenticated service message over the second LCL to the second encryptor;

encrypting the authenticated service message by using the current encryption key in the second encryptor;

transmitting the encrypted authenticated service message to the first encryptor over the transport link;

decrypting the encrypted authenticated service message in the first encryptor by using the current encryption key;

transmitting the authenticated service message from the first encryptor to the key negotiation module of the transmitting node over the first LCL; and verifying authenticity of the received service message by using the current authentication key in the key negotiation module of the transmitting node, wherein, if the verification of authenticity is successful, then transmitting the service message from the key negotiation module of the transmitting node to the transmitting quantum key generation module; else, signaling failed authentication; and proceeding to step B;

after generating a quantum key in the receiving and transmitting quantum key generation modules, transmitting the derived quantum key from the receiving quantum key generation module to the key negotiation module of the receiving node and from the transmitting quantum key generation module to the key negotiation module of the transmitting node;

storing the received quantum key in the key negotiation modules of the receiving and transmitting nodes;

checking a total size of stored quantum keys in the quantum key negotiation modules of the receiving and transmitting nodes, and, if the total size of the stored quantum keys is less than Key blocks, proceeding to step B;

generating a new authentication key and a new encryption key from Key blocks of the stored quantum key in the quantum key negotiation modules of the receiving and transmitting nodes, by performing the following steps:

generating the new authentication key in the quantum key negotiation module of the transmitting node by concatenating the first m blocks of the accumulated quantum key;

adding, to the new authentication key, an identifier in the form of a data block, the identifier comprising the authentication key counter value M1 and the authentication key feature value;

incrementing the authentication key counter value M1 by 1;

generating the new encryption key in the quantum key negotiation module of the transmitting node by concatenating next n blocks of the accumulated quantum key;

adding, to the new encryption key, an identifier in the form of a data block, the identifier comprising the encryption key counter value N1 and the encryption key feature value;

incrementing the encryption key counter value N1 by 1;

generating the new authentication key in the quantum key negotiation module of the receiving node by concatenating the first m blocks of the accumulated quantum key;

adding, to the new authentication key, an identifier in the form of a data block, the identifier comprising the authentication key counter value M2 and the authentication key feature value;

incrementing the authentication key counter value M2 by 1;

generating the new encryption key in the quantum key negotiation module of the receiving node by concatenating next n blocks of the accumulated quantum key;

adding, to the new encryption key, an identifier in the form of a data block, the identifier comprising the encryption key counter value N2 and the encryption key feature value;

incrementing the encryption key counter value N2 by 1; and comparing the identifiers of the obtained new authentication key and the obtained new encryption key from the key negotiation module of the receiving node with identifiers of the new authentication key and the new encryption key in the key negotiation module of the transmitting node, wherein:

if the authentication key identifiers match, then transmitting a message on successful verification of the authentication key identifiers from the key negotiation module of the transmitting node to the key negotiation module of the receiving node as an encrypted authenticated service message encrypted with the current encryption key and authenticated with the current authentication key;

receiving, in the key negotiation module of the transmitting node, the service message on successful verification of the authentication key identifiers; and replacing the current authentication key with the new authentication key in the key negotiation modules of the receiving and transmitting nodes;

else, proceeding to step A; and if the encryption key identifiers match, then transmitting a message on successful verification of the encryption key identifiers from the key negotiation module of the transmitting node to the key negotiation module of the receiving node as an encrypted authenticated service message encrypted with the current encryption key and authenticated with the current authentication key, and receiving, in the key negotiation module of the transmitting node, the service message on successful verification of the encryption key identifiers, else, proceeding to step A;

transmitting the generated new encryption keys from the key negotiation module of the transmitting node to the first encryptor over the first LCL and from the key negotiation module of the receiving node to the second encryptor over the second LCL; and comparing the identifier of the received new encryption key in the second encryptor with the identifiers of the new encryption key by performing the following steps:

transmitting the identifier of the new encryption key from the first encryptor to the second encryptor as an encrypted service message encrypted with the current encryption key;

receiving, in the second encryptor, the service message with the identifier of the new encryption key; and comparing, in the second encryptor, the identifiers of the new encryption keys;

if the encryption key identifiers do not match, then signaling failed reception of the encryption keys by the encryptors; and proceeding to step A;

else, storing the received encryption keys in the encryptors for further use.

\* \* \* \* \*